(12) United States Patent
Cardosa et al.

(10) Patent No.: US 10,789,106 B2
(45) Date of Patent: *Sep. 29, 2020

(54) SERVER CONSOLIDATION USING VIRTUAL MACHINE RESOURCE TRADEOFFS

(71) Applicant: International Business Machines Corporation, Armonk, NY (US)

(72) Inventors: Michael D. Cardosa, Andover, MN (US); Sandeep Gopisetty, San Jose, CA (US); Madhukar R. Korupolu, Sunnyvale, CA (US); Aameek Singh, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,473

(22) Filed: Feb. 28, 2019

(65) Prior Publication Data

US 2019/0258526 A1 Aug. 22, 2019

Related U.S. Application Data

(63) Continuation of application No. 15/206,140, filed on Jul. 8, 2016, now Pat. No. 10,282,234, which is a
(Continued)

(51) Int. Cl.
*G06F 9/50* (2006.01)
*G06F 9/455* (2018.01)

(52) U.S. Cl.
CPC ........ *G06F 9/5077* (2013.01); *G06F 9/45541* (2013.01); *G06F 9/45558* (2013.01);
(Continued)

(58) Field of Classification Search
CPC .............. G06F 9/5077; G06F 9/45541; G06F 9/45558; G06F 9/5038; G06F 9/5044;
(Continued)

(56) References Cited

U.S. PATENT DOCUMENTS 7,146,602 B2 12/2006 Frerking et al.
7,383,327 B1 6/2008 Tormasov et al.
(Continued)

FOREIGN PATENT DOCUMENTS

WO 2007/136437 A1 11/2007

OTHER PUBLICATIONS

Ruth, P. et al., "Autonomic Live Adaptation of Virtual Computational Environments in a Multi-Domain Infrastructure", Department of Computer Science, Purdue University, Jun. 2006, pp. 5-14, downloaded at http://friends.cs.purdue.edu/pubs/ICAC2006.pdf, West Lafayette, IN.
(Continued)

*Primary Examiner* — Joseph L Greene
(74) *Attorney, Agent, or Firm* — Sherman IP LLP; Kenneth L. Sherman; Hemavathy Perumal

(57) ABSTRACT

A virtual machine is assigned to a target physical server based on virtualization parameters for maximizing utility of a multiple virtual machines and physical servers. Resource allocation is performed for and deployment of the virtual machine to the target physical server based on capabilities of the target physical server and multiple virtual machine resource requirements. The virtualization parameters include a minimum parameter, a maximum parameter and a shares parameter. Processing resources are allocated based on utility priority of applications operating on the virtual machine using the shares parameter of contending virtual machines to determine a processing cycle ratio for distributing processing cycles between different utility priority applications operating on the contending virtual machines.

20 Claims, 8 Drawing Sheets

Related U.S. Application Data continuation of application No. 12/476,061, filed on Jun. 1, 2009, now Pat. No. 9,424,094.

(52) U.S. Cl.
CPC .......... *G06F 9/5038* (2013.01); *G06F 9/5044* (2013.01); *G06F 9/5094* (2013.01); *G06F 2009/4557* (2013.01); *G06F 2009/45595* (2013.01); *G06F 2209/504* (2013.01); *G06F 2209/5014* (2013.01); *Y02D 10/22* (2018.01)

(58) Field of Classification Search
CPC .......... G06F 9/5094; G06F 2009/4557; G06F 2009/45595; G06F 2209/5014; G06F 2209/504; Y02D 10/22
USPC .......................................................... 718/1
See application file for complete search history.

(56) References Cited

U.S. PATENT DOCUMENTS

| | | |
|---|---|---|
| 2003/0046396 A1 | 3/2003 | Richter et al. |
| 2004/0117794 A1 | 7/2004 | Kundu |
| 2005/0086659 A1 | 4/2005 | Huras |
| 2005/0149940 A1 | 7/2005 | Calinescu |
| 2006/0069761 A1 | 3/2006 | Singh et al. |
| 2007/0067435 A1 | 3/2007 | Landis |
| 2007/0250621 A1 | 10/2007 | Hillier |
| 2007/0250829 A1 | 10/2007 | Hillier et al. |
| 2008/0034366 A1 | 2/2008 | Tanaka |
| 2008/0163239 A1 | 7/2008 | Sugumar et al. |
| 2008/0196043 A1 | 8/2008 | Feinleib et al. |
| 2008/0270199 A1 | 10/2008 | Chess |
| 2009/0204826 A1* | 8/2009 | Cox ...................... G06F 1/3203 713/320 |
| 2009/0276771 A1 | 11/2009 | Nickolov et al. |
| 2010/0070784 A1* | 3/2010 | Gupta ................... G06F 1/3203 713/310 |
| 2010/0242045 A1* | 9/2010 | Swamy ................... G06F 9/455 718/104 |
| 2010/0306377 A1* | 12/2010 | DeHaan ................ G06F 9/5077 709/226 |

OTHER PUBLICATIONS

Verma, A., et al, pMapper: Power and Migration Cost Aware Application Placement in Virtualized Systems:, In ACM 9th International Middleware Conference, 2008, LNCS 5346, pp. 243-264.

Bobroff, N., "Dynamic Placement of Virtual Machines for Managing SLA Violations", Proceedings of the 10th IEEE Symposium on Integrated Management (IM), 2007, pp. 119-128.

Khanna, G., et al., "Application Performance Management in Virtualized Server Environments", Proceedings of 10th IEEE/IFIP Network Ops and Management Symp. (NOMS 2006), 2006, pp. 373-381.

Chess D.M., et al., "Experience with Collaborating Managers: Node Group Manager and Provisioning Manager," Proceedings of the Second International Conference on Autonomic Computing (ICAC'05), Jun. 2005, pp. 39-50.

Verma, A., et al., "Power-aware Dynamic Placement of HPC Applications", Proceedings of the 22nd Annual International Conference on Supercomputing (ICS 2008), Jun. 2008, pp. 175-184.

Carrera, D., et al., "Utility-based Placement of Dynamic Web Applications with Fairness Goals", Proceedings of 11th IEEE/IFIP Network Ops and Management Symp. (NOMS 2008), Apr. 2008, pp. 9-16, Salvador, Bahia.

AuYoung, A., et al., "Service Contracts and Aggregate Utility Functions", 15th IEEE International Symposium on High Performance Distributed Computing, Jul. 2006, pp. 119-131.

Steinder M., et al., "Server virtualization in autonomic management of heterogeneous workloads," Integrated Network Management, 2007, pp. 94-95.

Wood, T., et al., "Black-box and Gray-box Strategies for Virtual Machine Migration," in Proceedings of Symposium on Networked Systems Design and Implementation, 2007, pp. 229-242.

Singh, A., et al., "Server-Storage Virtualization: Integration and Load Balancing in Data Centers," Proceedings of IEEE/ACM Supercomputing, Nov. 2008, Article No. 53.

U.S. Non-Final Office Action for U.S. Appl. No. 12/476,061 dated Jun. 8, 2011.

U.S. Final Office Action for U.S. Appl. No. 12/476,061 dated Nov. 28, 2011.

U.S. Non-Final Office Action for U.S. Appl. No. 12/476,061 dated Mar. 25, 2014.

U.S. Advisory Action for U.S. Appl. No. 12/476,061 dated Jan. 15, 2015.

U.S. Non-Final Office Action for U.S. Appl. No. 12/476,061 dated Apr. 8, 2015.

U.S. Final Office Action for U.S. Appl. No. 12/476,061 dated Oct. 22, 2015.

U.S. Advisory Action for U.S. Appl. No. 12/476,061 dated Jan. 5, 2016.

U.S. Notice of Allowance for U.S. Appl. No. 12/476,061 dated Apr. 20, 2016.

U.S. Non-Final Office Action for U.S. Appl. No. 15/206,140 dated May 17, 2018.

U.S. Notice of Allowance for U.S. Appl. No. 15/206,140 dated Dec. 26, 2018.

\* cited by examiner

- Allocation Function: $A: V \to S \times \mathfrak{R}^+$ $A(V_i).Server \quad \nearrow \quad \searrow \quad A(V_i).Size$ $V_i.m \leq A(V_i).Size \leq V_i.M$

- VMs allocated to a server

$VSet_A(S_j) = \{V_i : A(V_i).Server = S_j\}$

- Utility from a server

$Util_A(S_j) = \begin{cases} 0 \text{ if } VSet_A(S_j) \text{ is empty} \\ \sum_{V_i \in VSet_A(S_j)} V_i.u\,(A(V_i).Size) \text{ otherwise} \end{cases}$

- Objective maximize $\left(\sum_j Util_A(S_j)\right) - \sum_{j: VSet_A(S_j) \neq \emptyset} P_j$ subject to $V_i.m \leq A(V_i).Size \leq V_i.M$ for each $V_i \in V$ $\sum_{V_i \in VSet(S_j)} A(V_i).Size \leq C_j$ for each $S_j \in S$

FIG. 5A

SERVER CONSOLIDATION USING VIRTUAL MACHINE RESOURCE TRADEOFFS

BACKGROUND

Server virtualization involves simulating several virtual machines (VMs), each running a separate operating system (OS) instance on a single physical server. Each OS may run in a different VM. For example, Xen is a virtual machine monitor (VMM), also known as a hypervisor, for managing the VMs that execute on a host operating system to provide the functionality of several guest operating systems on top of the host, on the same computer hardware (physical machine), at the same time. Server virtualization technologies are becoming increasingly commonplace in data centers. These enable applications to be packaged inside virtual machines and allow multiple VMs to run on a single physical machine without interfering with each other. This provides increased utilization of resources and consolidation of server, space and data center costs.

Modern server virtualization technologies are transforming enterprise data centers including information technology (IT) hardware and software systems. By consolidating multiple physical bare-metal servers into fewer virtualized machines, enterprises are improving resource utilizations and reducing operational costs. Virtualization technologies provide administrators with the ability to manually set virtualization parameters. The virtualization parameters include a minimum amount of resource required for a VM (min, also referred to as a reservation), a maximum allowable resource (max, also called a limit) and its share of spare resource (shares, also referred as the weight in Xen schedulers).

SUMMARY

One or more embodiments include assigning a virtual machine to a target physical server based on a plurality of virtualization parameters for maximizing utility of a plurality of virtual machines and physical servers. Resource allocation is performed for and deployment of the virtual machine to the target physical server based on capabilities of the target physical server and a plurality of virtual machine resource requirements. The plurality of virtualization parameters comprise a minimum parameter for a minimum amount of resources required for a particular virtual machine to operate, a maximum parameter for a maximum limit for resource allocation for the particular virtual machine and a shares parameter for shares allocation of multiple different spare resources between contending virtual machines. Processing resources are allocated based on utility priority of applications operating on the virtual machine using the shares parameter of contending virtual machines to determine a processing cycle ratio for distributing processing cycles between different utility priority applications operating on the contending virtual machines.

BRIEF DESCRIPTION OF THE DRAWINGS

FIG. 5A illustrates example steps for server consolidation using virtual machine shares and power-performance tradeoffs;

DETAILED DESCRIPTION

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc. The description may disclose several preferred embodiments for information technology (IT) virtual machines. While the following description will be described in terms of such languages for clarity and placing the invention in context, it should be kept in mind that the teachings herein may have broad application to all types of systems, devices and applications.

Determining virtual machine (VM) shares and power-performance tradeoffs during server consolidation, is provided. Consolidation herein involves a process of transitioning applications from non-virtualized physical servers (e.g., Windows server, Linux servers) to fewer virtualized servers (e.g., VMware, Xen) by converting them into VMs.

A consolidation process disclosed herein assigns VMs to physical server and utilizes virtualization parameters such as minimum (min) amount of resource required for each VM and maximum allowable resource (max) for the VM, to determine share of spare resource for each VM application. Such virtualization parameters are useful constructs that ensure intelligent distribution of resources between different applications (especially when there are a heterogeneous set of VM applications with different priorities and resource affinities). The consolidation process is directed to placement of VMs in terms of which combinations of application VMs are placed on each physical server, while considering resource allocation (shares) for each VM based on different priorities and resource affinities. This granularity in resource allocation positively impacts the utility of a consolidated system.

For example, in a typical enterprise data center, there are a variety of co-existing high priority applications such as company e-commerce web server and low priority applications such as an intranet blogging server. According to the consolidation process, in one scenario, under high load situations, valuable processor (CPU) resources are best utilized when allocated to high priority VM applications instead of the low priority ones. Along with different priorities, different VM applications in the data center have a different affinity for each resource. For example, a web server may value additional CPU cycles much more than a storage backup application. In such scenarios as well, CPU resources are best allocated to the higher utility VM application (e.g., the web server).

Figure 1:
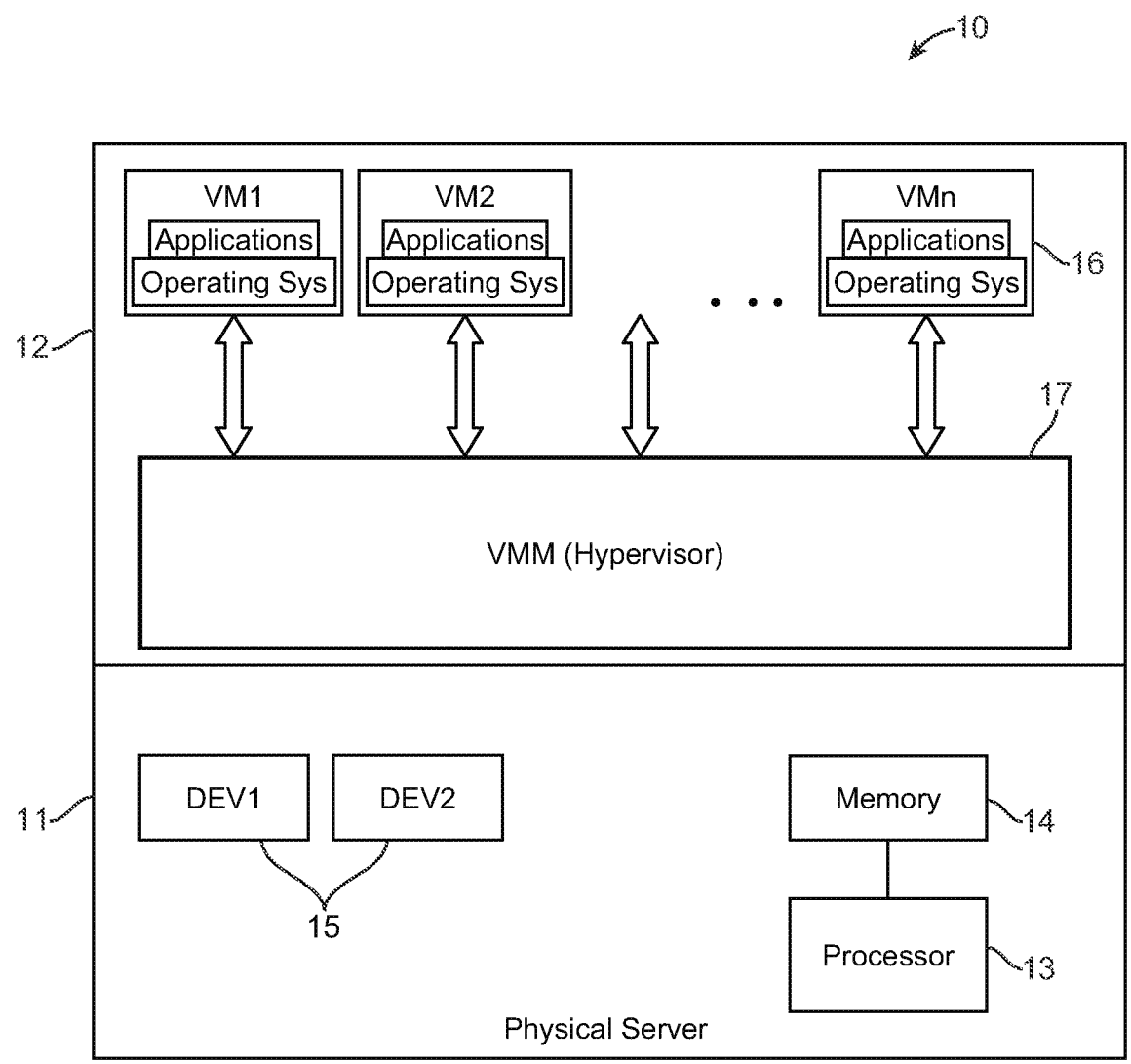
FIG. 1 shows architecture of an embodiment of a virtual machine system.

FIG. 1 shows a functional block diagram of a computing environment 10 that includes hardware resources 11 and software resources 12. The hardware resources 11 include a processor 13, memory 14, and electronic/computing devices 15 (DEV1, DEV2). The software resources 12 includes multiple VMs 16 (VM1, ..., VMn) that are managed by a virtual machine monitor (VMM) or hypervisor 17 (e.g., Xen). The hypervisor 17 provides virtualized resources to the individual VMs.

Figure 2:
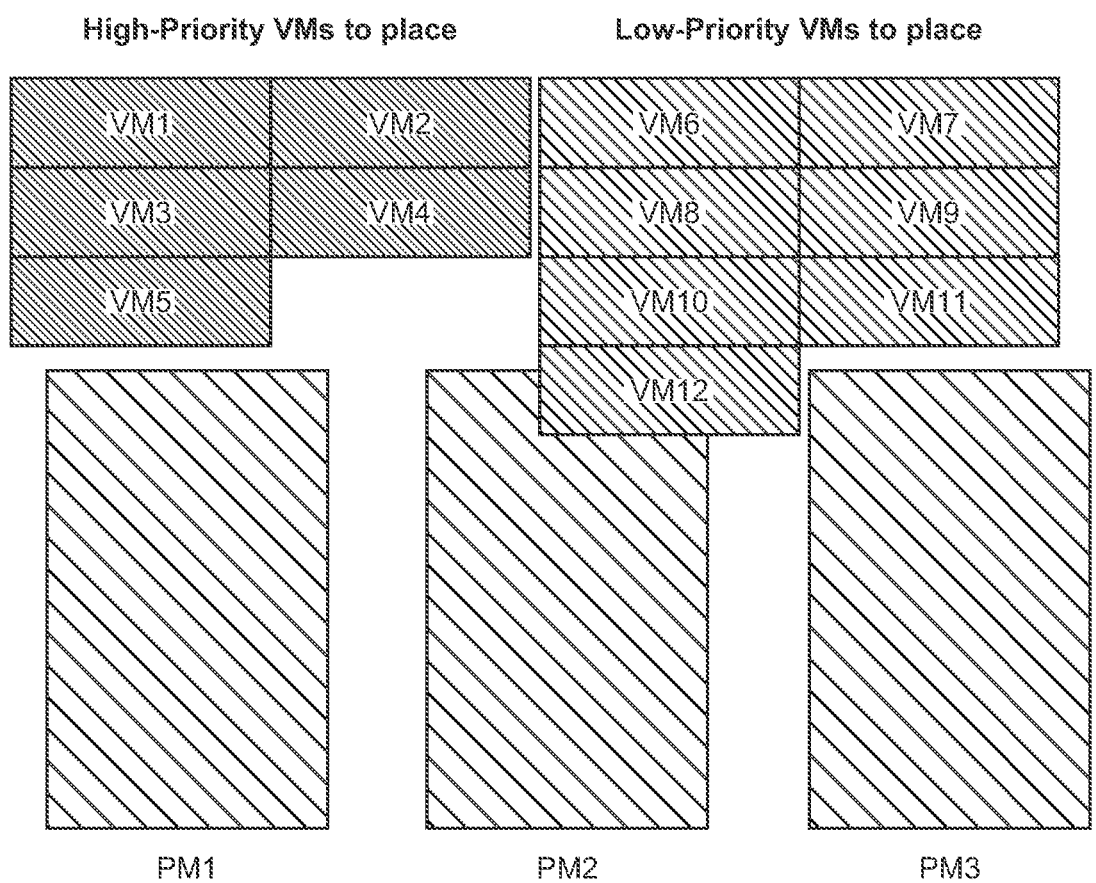
FIG. 2 shows an example of plural virtual machines for consolidation onto multiple servers.

Given a set of applications to be virtualized into virtual machines (VMs), a consolidation process disclosed herein determines proper placement of VM into target physical servers (physical machines (PMs)) based on a power-performance tradeoff during server consolidation, using placement and resource allocation techniques leveraging VM min, max and shares parameters. FIG. 2 shows a set of VMs (e.g., VM1, ..., VM12) for placement into a set of PMs (e.g., PM1, PM2, PM3).

Virtualization parameters such as min, max and shares for each VM application are automatically determined and utilized in the automated consolidation process disclosed herein. The min parameter represents a resource reservation, the max represents a maximum allowable resource (a limit), and the shares parameter represents share of spare resources (a weight). Setting a min parameter for a VM ensures that it receives at least that amount of resources when powered on, and setting a max parameter for a low priority application ensures that it does not use more resources, thus keeping them available for high-priority applications. Shares parameters provide information to a virtualization scheduler on how to distribute resources between contending VMs. For example, a CPU shares parameter ratio of 1:4 between low and high priority VMs informs the scheduler to provide 4 CPU cycles to the high priority VM for each CPU cycle given to the low priority one.

Figure 3:
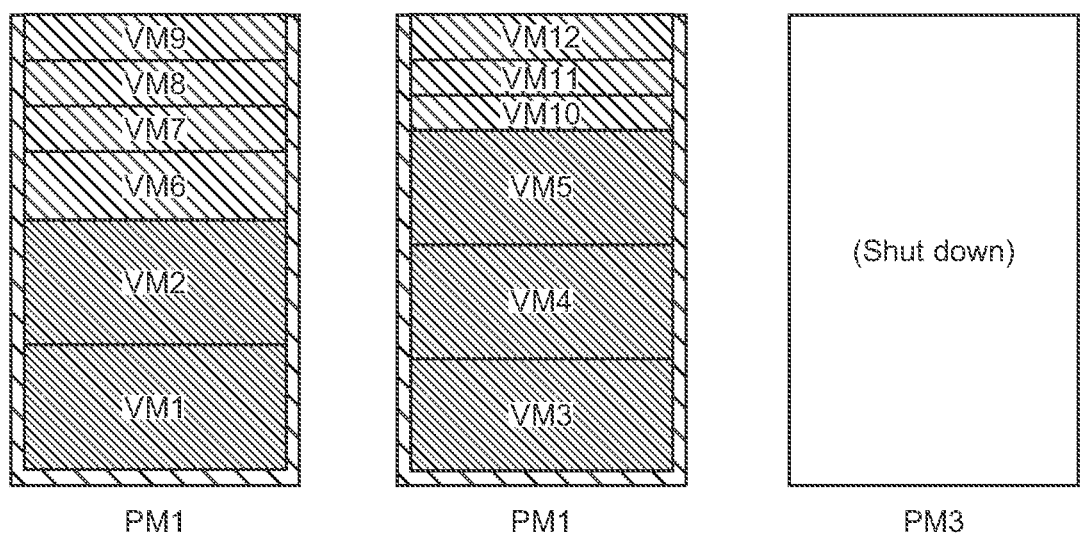
FIG. 3 shows an example of server consolidation using virtual machine shares and power-performance tradeoffs.

A suitable placement of VMs onto a small set of target servers according to the consolidation process is determined, and resource allocation for each VM is performed, taking server capabilities into account and taking VM resource requirements into account. The goal is to perform optimization in a manner to essentially maximize total utility of the system, which may be achieved through a suitable combination of minimizing number of servers (PMs) utilized, minimizing power and maximizing utilization or performance. The disclosed optimization aims to maximize the utility gained by the system. Such optimization does not require finding an allocation solution which absolutely minimizes number of physical servers and absolutely minimizes power consumption while simultaneously absolutely maximizing utilization or performance. A utility function takes such measures into account, and finds suitable tradeoff therebetween such that the overall system utility is maximized. The Min, max, shares parameters allow VMs to grow/shrink. Consolidation involves power cost concerns. FIG. 3 shows an example placement of VM1, ..., VM12 into PM1, PM2, PM3, where PM3 is shut down. Higher-utility solutions with high priority VMs receive more resources.

One embodiment of a server consolidation process disclosed herein comprises implementing power-performance tradeoffs for placement and power consolidation of VMs in data centers, by taking advantage of the min, max and shares features for virtualization technologies. The process allows power-performance tradeoffs in modern data centers running heterogeneous applications, wherein the amount of server resources (e.g., CPU, memory, storage, bandwidth, etc.) allocated to a VM can be adjusted based on available resources, power costs, and application utilities. The consolidation process is applicable across a broad spectrum of inputs (i.e., varying VM sizes and utilities, varying server capacities and varying power costs) thus providing a practical consolidation solution for administrators.

Figure 4:
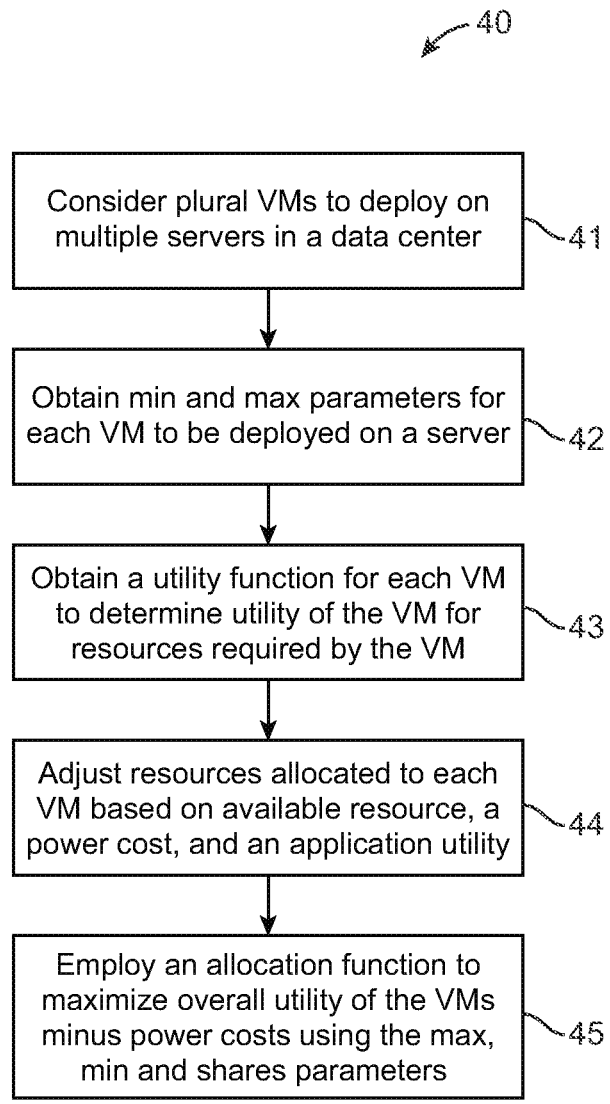
FIG. 4 shows a flowchart of an example process for server consolidation using virtual machine shares and power-performance tradeoffs.

FIG. 4 shows a flowchart of a consolidation process 40, disclosed herein, comprising:

Block 41: Consider plural VMs to deploy on multiple servers in a data center.

Block 42: Obtain min and max parameters for each VM to be deployed on a server. Determine shares for each VM (described further below). The min and max can be obtained manually by an administrator, or preferably automatically derived from performance log traces of applications running on physical servers (PMs). In the latter case, min can be obtained by observing the absolute minimum amount of resources used by an application in all its traces (e.g. 512 MHz of CPU). Further, max can be obtained by observing the absolute max in the traces and capping it with a configurable threshold (e.g. max observed=1024 MHz and threshold cap=80%, max value set=0.8×1024 MHz, where "×" represents mathematical product)

Block 43: Obtain a utility function for each VM to determine utility of the VM for resources required by the VM. The utility function can be obtained manually through the administrator and/or available as part of an application template provided by an application vendor.

Block 44: Allocate and selectively adjust resources for each VM based on available resource, a power cost, and an application utility.

Block 45: Employ an allocation function to maximize overall utility of the VMs minus power costs using the max, min and shares parameters.

In one implementation, a consolidation process employs VM min, max and share parameters to provide a power-performance tradeoff during the data center consolidation. A set of servers to be consolidated in the data center is considered, wherein the set of servers comprise a set of physical servers and a set of virtual servers.

Employing VM min, max and shares parameters involves obtaining parameters including a reservation quantity parameter, limit quantity parameter, and a weight quantity parameter for each of the VMs for consolidation in the set of servers (PMs). The reservation parameter represents a minimum amount of resources required for the VM. The limit parameter represents the maximum of resources required for the VM. The weight parameter represents a share of spare resources for the VM. Consolidation is based on the reservation, the limit, and the weight parameters for each VM. A utility function is employed for each VM, wherein the utility function considers the output the virtual machine can generate using resources allocated to the VM. The allocated resources for the VM may be adjusted based on available resources, power costs, and application utility.

A set of target VMs, each having a resource capacity, is considered for server consolidation. An allocation function is employed for maximizing the overall utility of the set of VMs, discounting the power costs incurred using the min (reservation), max (limit) and shares (weight) parameters (e.g., using an enhanced knapsack allocation function). Allocation for each VM comprises a target physical machine on which the VM is to be deployed and an amount of resources on the target physical machine to be allocated to the VM. Consolidation may further comprise scenarios of decommissioning physical servers and deploying their applications as VMs.

Figure 5B:
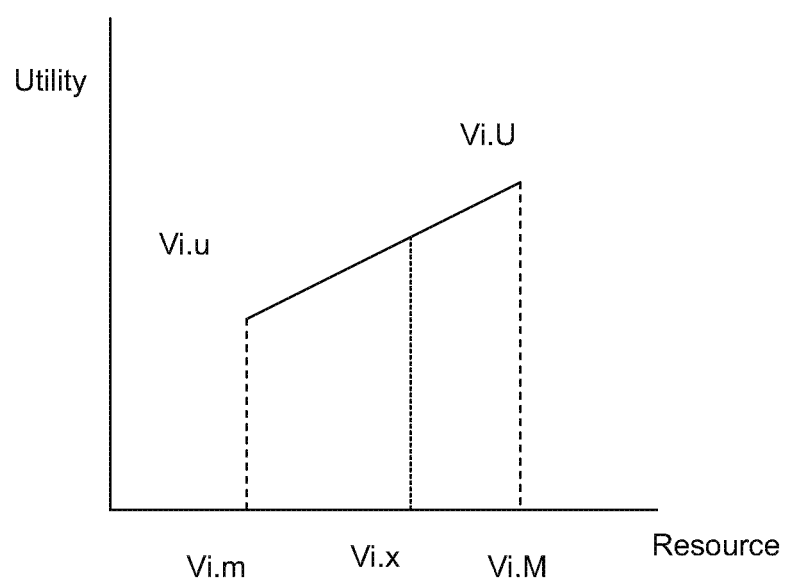
FIG. 5B shows a plot of allocated resource vs. utility based on service level agreement (SLA) information.

FIG. 5A illustrates a formal definition of a set of VMs, $v=\{V_1, V_2, \ldots, V_{|v|}\}$, wherein each VM has a <min, max> amount of resource required (i.e., min parameter $V_i.m$, and max parameter $V_i.M$). Utility functions $v_i.u$ and $V_i.U$ corresponds to min and max parameters, respectively. The utility value at $V_i.m$ is $V_i.u$ and the utility value at $V_i.M$ is $V_i.U$. A linear interpolation between the two Cartesian points ($V_i.m$, $V_i.u$) and ($V_i.M$, $V_i.U$) is determined from application templates and service level agreement (SLA) importance scales. Thus, the utility value at any value x ($V_i.m<V_i.x<V_i.M$), $V_i.x=V_i.u+[(V_i.x-V_i.m)\times(V_i.U-V_i.u)/(V_i.M-V_i.m)]$. In other words, assuming that in a Cartesian coordinate system of allocated resource value vs. utility, a line connects the two points ($V_i.m$, $V_i.u$) and ($V_i.M$, $V_i.U$), the utility for allocated resource value x is provided by the value of said line at x, as shown by example in FIG. 5B.

The formalism used in FIG. 5A defines the allocation function to include both assignment and share calculation. The set of VMs is to be consolidated on a set of nodes (servers) $S=\{S_1, S_2, \ldots, S_{|S|}\}$. Each node has a capacity $C_j$ of resources, wherein power cost of keeping a server on is $P_j$. The goal is to consolidate (pack) VMs into the computing nodes and determine shares for each VM, maximizing total net utility, wherein:

Net Utility=Utility from applications−power cost of keeping servers on.

The consolidation process results in placing VMs among computing nodes in a data center considering a minimum and a maximum range for VM resource requirement along with an associated utility for each VM as a function of the amount of resource allocated to it. In one embodiment of the present invention, the consolidation process comprises: ordering VMs by profitability, order computing nodes by power efficiency and determining VM shares for each VM placed on every computing node, combining VM shares and placement decisions to maximize utility. In one example, an enhanced knapsack strategy may be used to select VMs to pack into servers along with determining the shares for each VM. Example implementations for determining the shares in terms of resource allocation for each VM include: GreedyMax, ExpandMinMax, PowerExpandMinMax and node-based methods, described below.

GreedyMax

The GreedyMax strategy sorts the VMs by their profitability at max, i.e., (utility $V_i.U$)/(size($V_i.M$) and places VMs in that order in a first-fit fashion, allocating the max requested resource amount for each VM. A profitability metric captures the utility of a VM per unit resource that is allocated to the VM and is useful in identifying VMs that provide higher utility for every unit of resource that the VM consumes. Sorting the VMs in decreasing order of their profitability enables GreedyMax to perform better than a basic strategy that packs all the VMs at their max requirement and leaves a certain amount of room in each server to account for future growth of the VMs. The GreedyMax performs specially better when the number of server nodes is small.

As shown by example pseudocode in Table 1 below, the GreedyMax process sorts VMs in order of their profitability at max ($V_i.u$)/($V_i.U$), and provides resource allocations for VMs at the max. This process always provides an allocation (shares) A comprising max resources to each VM.

TABLE 1

GreedyMax pseudocode
GREEDYMAX(VMs V, SERVER NODES $\mathcal{S}$)

Output: A : V → $\mathcal{S}$ × $\mathfrak{R}^+$

1:   Sort server nodes in increasing order of power rate, $\frac{P_j}{C_j}$

2:   Sort VMs in decreasing order of profitability at max, $\frac{V_i \cdot U}{V_i \cdot M}$.

3:   for i = 1 ... |V| do

4:   Set j ← first node such that $\sum_{V_i \in VSet(S_j)} \Box A(V_i) \cdot Size + V_i \cdot M \leq C_j$ 5:     Set $A(V_i) = (S_j, V_i \cdot M)$
6:   end for
7:   return A GreedyMinMax The GreedyMinMax process does not always require allocation of resources (shares) to each VM at its maximum requested allocation. It takes into consideration the possibility that some VMs may be more profitable at another smaller size and allocating resources (shares) at that size may yield a better overall utility by leaving room for more VMs. As such, GreedyMinMax involves considering both the min and max points for each VM in determining shares. GreedyMinMax utilizes two items, $V_i^{min}$ and $V_i^{max}$, for each virtual machine $V_i$, wherein $V_i^{min}$ is at size $V_i.m$ and utility $V_i.u$ whereas $V_i^{max}$ is at size $V_i.M$ and utility $V_i.U$. Beginning with a set |v| of VMs, the GreedyMinMax has a set of 2|v| items $\bar{v}$ in decreasing order of profitability and starts placing them one by one in a first-fit manner among the available nodes. When placing a $V_i$ item, such as corresponding to $V_i^{min}$, GreedyMinMax removes the other one (i.e., $V_i^{max}$) from the list and vice-versa. This ensures that only one of the two $V_i$ items is placed for each VM.

ExpandMinMax (Expanding Between Min and Max)

Instead of selecting the node for each VM in a first-fit fashion, the ExpandMinMax process first computes an estimated utility for each node if the new VM were placed to that node and selects the node that provides the best utility improvement. The utility for each node is computed by first setting a resource allocation for all the VMs assigned to the node to be at min, and then expanding allocation for the VMs that provide the most incremental utility per unit capacity until either the capacity of each is reached, or no further expansion is possible.

A set of VMs Q are feasible for a node $S_j$ if the minimum allocation requirements of the VMs in Q sum up to less than the capacity of node $S_j$. Once a set of VMs Q is feasible for $S_j$, a method of estimating the utility of node $S_j$ using the set of VMs Q is applied, such as shown by example in Table 2 below.

Instead of assigning VMs in a first-fit manner, ExpandMinMax assigns each VM to the node $S_j$ that maximizes the utility gain (i.e., NodeUtility ($S_j$, Set($S_j$)+$V_i$)−NodeUtility ($S_j$, Set($S_j$))), wherein Set($S_j$) is the set of VMs currently assigned to $S_j$. If nothing has been assigned to $S_j$ yet, Set($S_j$) is considered to be empty and the corresponding NodeUtility is zero. Note that ExpandMinMax implicitly expands VMs on each node to realize the maximum utility possible from them.

As shown by example pseudocode in Table 2 below, an ExpandMinMax process considers each VM as two items (at min and at max). The process sorts the VMs in order of their profitability (at min and max) based on a utility function, then provides resource allocation (shares) A for a VM on a node only if node utility shows improvement.

TABLE 2

ExpandMinMax pseudocode
EXPANDMINMAX(VMs V, SERVER NODES $\mathbb{S}$)

Output: $A : V \rightarrow \mathbb{S} \times \mathfrak{R}^+$

1: Sort server nodes in increasing order of power rate, $\frac{P_j}{C_j}$

2: $\overline{V} \leftarrow \emptyset$
3: for i = 1 ... |V| do
4:    Set item $V_i^{min\square}$ to be of size $V_i \cdot m$ and utility $V_i \cdot u$
5:    Set item $V_i^{max\square}$ to be of size $V_i \cdot M$ and utility $V_i \cdot U$
6:    $\overline{V} \leftarrow \overline{V} \cup \{V_i^{min}, V_i^{max\square}\}$
7: end for
8: Sort $\overline{V}$ in decreasing order of profitabilities.
9: while $\overline{V}$ not empty do
10:   Remove the first entry of $\overline{V}$, say it corresponds to $V_i$.
11:   $j \leftarrow \text{argmax}_{S_j \in S} \text{NodeUtility}(S_j, \text{Set}(S_j) + V_i) - \text{NodeUtility}(S_j, \text{Set}(S_j))$
12:   if feasible $(S_j, \text{Set}(S_j) + V_i)$ then
13:     for VMs $V_k \in \text{Set}(S_j) + V_i$ do
14:       Set $A(V_k) \leftarrow (S_j, x_k)$ where $x_k$ is as dictated by the NodeUtility$(S_j, \text{Set}(S_j) + V_i)$ function
15:     end for
16:     Remove the corresp. complementary entry of $V_i$ from $\overline{V}$
17:   end if
18: end while
19: return A Table 3 below shows pseudocode for computing the utility derived from a computing node given the set of VMs that are placed on it.

TABLE 3

NodeUtility pseudocode
NODEUTILITY(SERVER $S_j$, SET OF VMS Q)

1:   remCapacity = $C_j - \Sigma_{V_i \in Q} V_i \cdot m$
2:   return −1 if (remCapacty < 0)

3: $$nodeUtility = \sum_{V_i \in Q} \square V_i \cdot u$$

4: Sort VMs in Q in decreasing order of $\frac{V_i \cdot U - V_i \cdot u}{V_i \cdot M - V_i \cdot m}$ 5:   for i = 1 ... |Q| do
6:     Let the ith item of Q correspond to VM, $V_i$.
7:     if (remCapacity > 0) then
8:       $\delta = \min(V_i \cdot M - V_i \cdot m, \text{remCapacity})$
9:       remCapacity−= $\delta$
10:      nodeUtility+= $V_i \cdot \text{util}(V_i \cdot m + \delta) - V_i \cdot u$;
11:     else
12:       return nodeUtility
13:     end if
14:   end for
15:   return nodeUtility The NODE Utility function is used in the ExpandMinMax method described further above and in the PowerExpand-MinMax described below.

PowerExpandMinMax

The PowerExpandMinMax process is similar to Expand-MinMax except that PowerExpandMinMax employs a comparative measure comprising the node utility gain minus the proportional power cost incurred (if any) on the new node, for determining shares. The latter quantity applies only when a new node is being started, and in this case the power cost of the machine is scaled down to a size used by the VM and that is considered the proportional power cost for the VM. This may on occasion result in a negative net gain, especially when the proportional power cost of the new node exceeds the utility gain from the VM, in which case the process may select a different (already opened) node that provides better utility gain. However, if all opened nodes yield much smaller (more negative) utility gain, then the new node will still be selected. The latter may occur, for example, if adding a new VM to an already opened node causes more valuable VMs to be compressed.

As shown by example pseudocode in Table 4 below, a PowerExpandMinMax process prevents unnecessary starting of new servers. A VM being added to a node must justify proportional share of power cost. The pseudocode provides resource allocation (shares) A for a VM on a node.

TABLE 4

PowerExpandMinMax pseudocode
POWEREXPANDMINMAX(VMs V SERVERS $\mathbb{S}$)

Output: $A : V \rightarrow \mathbb{S} \times \mathfrak{R}^+$

1: Sort server nodes in increasing power rate, $\frac{P_j}{C_j}$ and set $\overline{V} \leftarrow \emptyset$ 2: for i = 1 ... |V| do
3:    Set item $V_i^{min\square}$ to be of size $V_i \cdot m$ and utility $V_i \cdot u$
4:    Set item $V_i^{max\square}$ to be of size $V_i \cdot M$ and utility $V_i \cdot U$
5:    $\overline{V} \leftarrow \overline{V} \cup \{V_i^{min}, V_i^{max\square}\}$
6: end for
7: Sort $\overline{V}$ in decreasing order of profitabilities.
8: while |V| not empty do
9:   Remove the first entry of $\overline{V}$, say it corresponds to $V_i$.
10:   for (feasible $S_j \in S$) do
11:     Compute NetGain$(S_j, V_i)$ as given in the formula
12:   end for
13:   $j \leftarrow \text{argmax}_{feasible S_j \in S} \text{NetGain}(S_j, V_i)$
14:   if feasible$(S_j, \text{Set}(S_j) + V_i)$ then
15:     Assign $V_i$ to node $S_j$
16:     for VMs $V_k \in \text{Set}(S_j) + V_i$ do
17:       Set $A(V_k) \leftarrow (S_j, x_k)$ where $x_k$ is as dictated by the NodeUtility$(S_j, \text{Set}(S_j) + V_i)$ function
18:     end for
19:     Remove the corresp. complementary entry of $V_i$ from $\overline{V}$
20:   end if
21: end while
22: return A If $S_j$ were an already opened node, i.e., Set$(S_j) \neq \emptyset$ then the net gain NetGain$(S_j, V_i)$ if $V_i$ were also added to $S_j$ is given by:

NetGain$(S_j, V_i)$=NodeUtility$(S_j, \text{Set}(S_j)+V_i)$−NodeUtility$(S_j, \text{Set}(S_j))$.

If $S_j$ is a new node, then NetGain$(S_j, V_i)$ is given by:

NetGain$(S_j, V_i)$=NodeUtility$(S_j, \{V_i\})−x_i \times P_j/C_j$ where $x_i$ is the size allocated for $V_i$ on $S_j$ as dictated by the NodeUtility$(S_j, \{V_i\})$ function.

Node Based Method

Another implementation of the consolidation process comprises: ordering nodes in increasing order of capacity size; for each node, executing an enhanced knapsack strategy to select VMs to pack into the along with determining the shares for each VM; ordering a list of VMs, wherein the list includes two entries for each VM (i.e., profitability at min, profitability at max); traversing the list of VMs; placing each VM into a current node if possible, otherwise moving to the next VM; if an item placed at max, remove its corresponding min; if item placed at min, remove its corresponding max but allow the VM to expand to max later if needed, once the node is closed; when no new VMs at min can fit, close the node, move to the next node; expand any VMs at the closed node in order of highest slope first, until the node capacity is completely filled.

The pseudocode for the above described node based method is shown below:

```
space_remaining = baseCapacity(n_i);
Sort VMs: v_1, ..., v_n by
MAX(profitability_{v_i,min},profitability_{v_i,max}),
wherein i = 1, .., n;
for each VM, if space_remaining > minCapacity(v_i), then:
    If profitability_{ v_i,min} > profitability_{ v_i,max}
        Allocate v_i to n_i at capacity min;
    Else
        Allocate v_i to n_i at capacity MIN(max,space_remaining);
    space_remaining = space_remaining – amount_allocated ;
If space_remaining > 0, then expand VMs allocated at min in order of
highest slope first, until space_remaining == 0 or no further VMs are
allocated at min.
```

As such, if the sum of utilities from VMs at their capacities on node $n_i$ does not exceed the node-level power cost, then the node is removed from consideration and no further VMs are placed in the system, otherwise the process continues to the next node.

Figure 6:
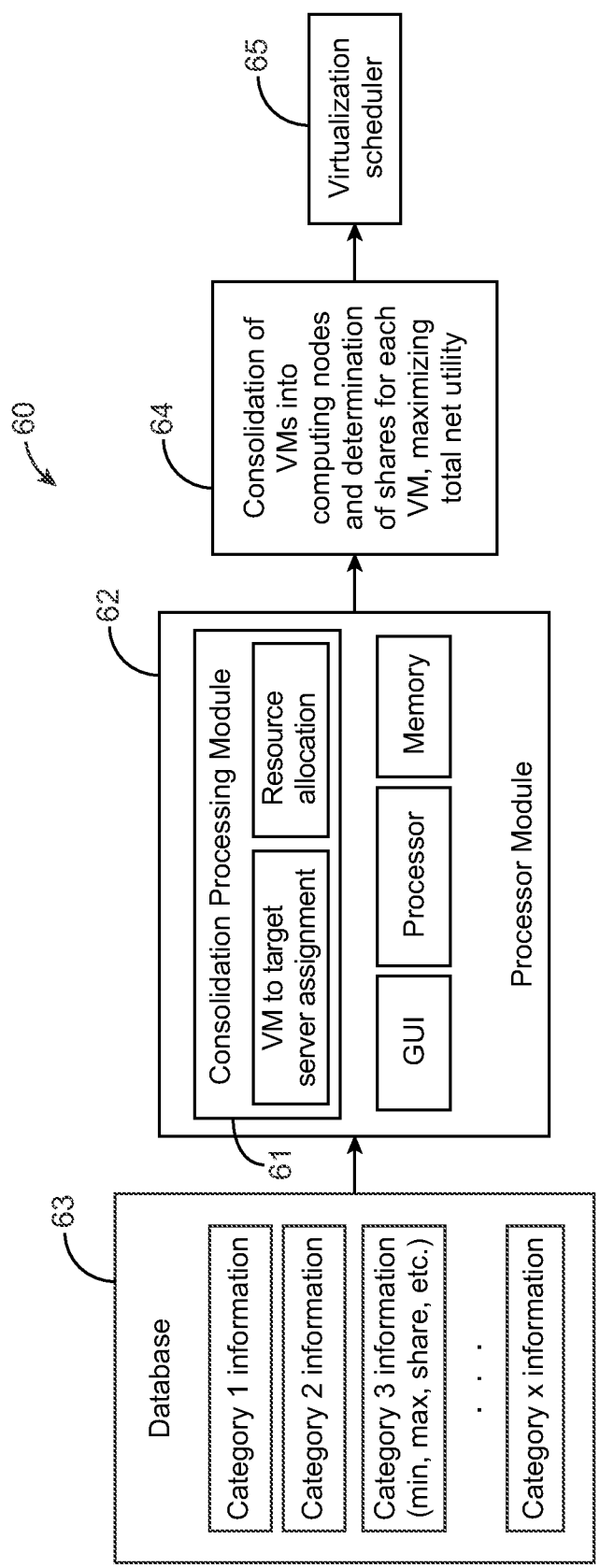
FIG. 6 shows an example system for server consolidation using virtual machine shares and power-performance tradeoffs.

FIG. 6 shows a functional block diagram of a consolidation processing system 60. The system 60 comprises a consolidation processing module 61 in a computer 62, wherein the consolidation processing module 61 implements an embodiment of the consolidation process described herein. The consolidation processing module 61 utilizes VM information from a database 63, to provide information 64 for consolidation of VMs into computing nodes and determination of shares for each VM, maximizing total net utility. Shares parameters provide information to a virtualization scheduler 65 on how to distribute resources between contending VMs. Said database 63 contains several categories of information, comprising:

Category 1 Information: Information about the Target Servers:
  These are the virtualized servers (e.g., VMware or Xen or others) that host the VMs to be consolidated. Information for each server type considered includes quantity of that server type available and for each server type the following data:
    1. Number of CPUs and speed of each CPU in MHz.
    2. Memory size (e.g., in megabytes).
    3. Storage interface configured (FC HBA or using Internet Protocol (IP)).
    4. IP Network interface configured.
    5. Power utilization (how much power is used for amount of CPU consumed). Power utilization can comprise a more complex power model out of which the consolidation process can derive relevant metrics.
    6. Constraints and limitations (e.g., particular server can only be assigned a maximum of 12 VMs, etc.).
Category 2 Information: Information about Source Applications:
  These are the applications that are being moved from a physical infrastructure into the new virtualized servers. For each application, the following data is available:
    1. CPU utilization over time.
    2. Memory utilization over time.
    3. Storage utilization over time.
    4. Network utilization over time.
    5. Constraints (e.g., one application can only be assigned to a particular type of server).
Category 3 Information: Consolidation Process Specific Data:
  This is the data that is required by the consolidation process:
    1. Min and max for each source application. This can be automatically derived as well from the Category 2 information above.
    2. Utility of each application at min and max value of resource. This may be input by an administrator via a graphical user interface (GUI) provided by the consolidation process.
    3. Cost of power (e.g., how much does X watts cost in the data center being considered for consolidation?).

The consolidation process comprises an analytical function for server consolidation by performing granular resource allocation during server consolidation, taking into account the utility of each VM application such that the overall utility of the system is maximized. The consolidation process employs virtualization and VM min, max, shares parameters for resource allocation analysis and enforcement. Employing min, max and shares parameters allows fine grained resource allocation to provide high utility workloads based on available physical server resources.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. The embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the embodiments of the invention can take the form of a computer program product accessible from a computer-usable or computer-readable medium providing program code for use by or in connection with a computer, processing device, or any instruction execution system. For the purposes of this description, a computer-usable or computer readable medium can be any apparatus that can contain, store, communicate, or transport the program for use by or in connection with the instruction execution system, apparatus, or device. The medium can be electronic, magnetic, optical, or a semiconductor system (or apparatus or device). Examples of a computer-readable medium include, but are not limited to, a semiconductor or solid state memory, magnetic tape, a removable computer diskette, a RAM, a read-only memory (ROM), a rigid magnetic disk, an optical disk, etc. Current examples of optical disks include compact disk-read-only memory (CD-ROM), compact disk-read/write (CD-R/W) and DVD.

I/O devices (including but not limited to keyboards, displays, pointing devices, etc.) can be connected to the system either directly or through intervening controllers. Network adapters may also be connected to the system to enable the data processing system to become connected to other data processing systems or remote printers or storage devices through intervening private or public networks.

Modems, cable modem and Ethernet cards are just a few of the currently available types of network adapters. In the description above, numerous specific details are set forth. However, it is understood that embodiments of the invention may be practiced without these specific details. For example, well-known equivalent components and elements may be substituted in place of those described herein, and similarly, well-known equivalent techniques may be substituted in place of the particular techniques disclosed. In other instances, well-known structures and techniques have not been shown in detail to avoid obscuring the understanding of this description.

The terms "computer program medium," "computer usable medium," "computer readable medium," and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information, from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor or multi-core processor to perform the features of the computer system. Accordingly, such computer programs represent controllers of the computer system.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Figure 7:
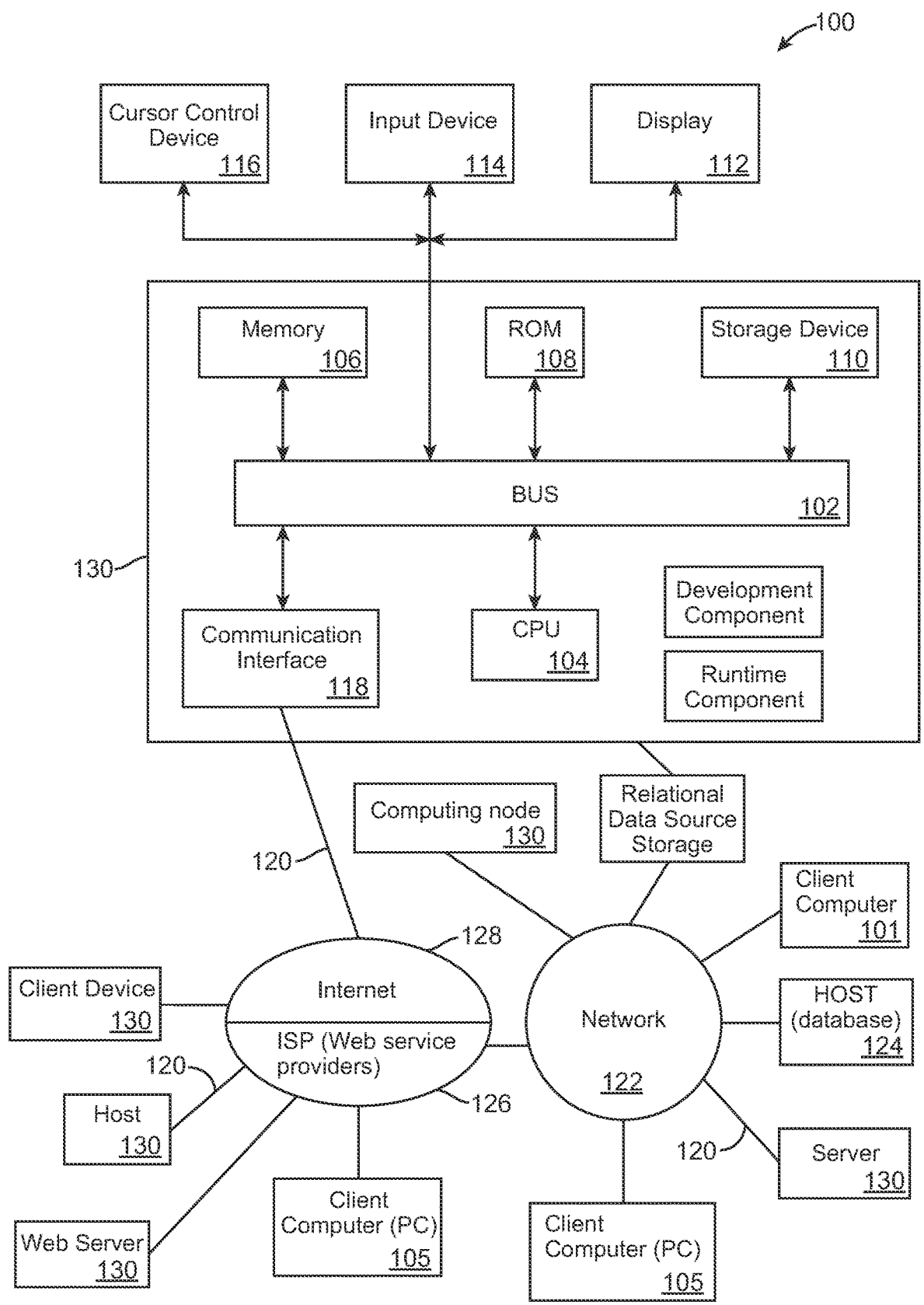
FIG. 7 shows a block diagram of a system in which a process for server consolidation using virtual machine shares and power-performance tradeoffs may be implemented.

FIG. 7 shows a block diagram of example architecture of an embodiment of a system 100 for implementing an embodiment of the invention. The system 100 includes one or more client devices 101 connected to one or more server computing systems 130. A server 130 includes a bus 102 or other communication mechanisms for communicating information, and a processor (CPU) 104 coupled with the bus 102 for processing information. The server 130 also includes a main memory 106, such as a random access memory (RAM) or other dynamic storage device, coupled to the bus 102 for storing information and instructions to be executed by the processor 104. The main memory 106 also may be used for storing temporary variables or other intermediate information during execution or instructions to be executed by the processor 104. The server computer system 130 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions. The bus 102 may contain, for example, thirty-two address lines for addressing video memory or main memory 106. The bus 102 can also include, for example, a 32-bit data bus for transferring data between and among the components, such as the CPU 104, the main memory 106, video memory and the storage 110. Alternatively, multiplex data/address lines may be used instead of separate data and address lines.

The server 130 may be coupled via the bus 102 to a display 112 for displaying information to a computer user. An input device 114, including alphanumeric and other keys, is coupled to the bus 102 for communicating information and command selections to the processor 104. Another type of user input device comprises cursor control 116, such as a mouse, a trackball, or cursor direction keys for communicating direction information and command selections to the processor 104 and for controlling cursor movement on the display 112.

According to one embodiment of the invention, the functions of the invention are performed by the server 130 in response to the processor 104 executing one or more sequences of one or more instructions contained in the main memory 106. Such instructions may be read into the main memory 106 from another computer-readable medium, such as the storage device 110. Execution of the sequences of instructions contained in the main memory 106 causes the processor 104 to perform the process steps described herein. One or more processors in a multi-processing arrangement may also be employed to execute the sequences of instructions contained in the main memory 106. In alternative embodiments, hard-wired circuitry may be used in place of or in combination with software instructions to implement the invention. Thus, embodiments of the invention are not limited to any specific combination of hardware circuitry and software.

Various forms of computer readable media may be involved in carrying one or more sequences of one or more instructions to the processor 104 for execution. For example, the instructions may initially be carried on a magnetic disk of a remote computer. The remote computer can load the instructions into its dynamic memory and send the instructions over a telephone line using a modem. A modem local to the server 130 can receive the data on the telephone line and use an infrared transmitter to convert the data to an infrared signal. An infrared detector coupled to the bus 102 can receive the data carried in the infrared signal and place the data on the bus 102. The bus 102 carries the data to the main memory 106, from which the processor 104 retrieves and executes the instructions. The instructions received from the main memory 106 may optionally be stored on the storage device 110 either before or after execution by the processor 104.

The server 130 also includes a communication interface 118 coupled to the bus 102. The communication interface 118 provides a two-way data communication coupling to a network link 120 that is connected to the world wide packet data communication network now commonly referred to as the Internet 128. The Internet 128 uses electrical, electromagnetic or optical signals that carry digital data streams. The signals through the various networks and the signals on the network link 120 and through the communication interface 118, which carry the digital data to and from the server 130, are exemplary forms or carrier waves transporting the information.

In another embodiment of the server 130, interface 118 is connected to a network 122 via a communication link 120. For example, the communication interface 118 may be an integrated services digital network (ISDN) card or a modem to provide a data communication connection to a corresponding type of telephone line, which can comprise part of the network link 120. As another example, the communication interface 118 may be a local area network (LAN) card to provide a data communication connection to a compatible LAN. Wireless links may also be implemented. In any such implementation, the communication interface 118 sends and receives electrical electromagnetic or optical signals that carry digital data streams representing various types of information.

The network link 120 typically provides data communication through one or more networks to other data devices. For example, the network link 120 may provide a connection through the local network 122 to a host computer 124 or to data equipment operated by an Internet Service Provider (ISP) 126. The ISP 126 in turn provides data communication services through the Internet 128. The local network 122 and the Internet 128 both use electrical, electromagnetic or optical signals that carry digital data streams. The signals through the various networks and the signals on the network link 120 and through the communication interface 118, which carry the digital data to and from the server 130, are exemplary forms or carrier waves transporting the information.

The server 130 can send/receive messages and data, including e-mail, program code, through the network, the network link 120 and the communication interface 118. Further, the communication interface 118 can comprise of a USB/Tuner and the network link 120 may be an antenna or cable for connecting the server 130 to a cable provider, satellite provider or other terrestrial transmission system for receiving messages, data and program code from another source.

The example versions of the invention described herein may be implemented as logical operations in a distributed processing system such as the system 100 including the servers 130. The logical operations of the present invention can be implemented as a sequence of steps executing in the server 130, and, as interconnected machine modules, within the system 100. The implementation is a matter of choice and can depend on performance of the system 100 implementing the invention. As such, the logical operations constituting said example versions of the invention are referred to for e.g. as operations, steps or modules.

Similar to a server 130 described above, a client device 101 can include a processor, memory, storage device, display, input device and communication interface (e.g., e-mail interface) for connecting the client device to the Internet 128, the ISP 126, or LAN 122, for communication with the servers 130.

The system 100 can further include computers (e.g., personal computers, computing nodes) 105 operating the same manner as client devices 101, wherein a user can utilize one or more computers 105 to manage data in the server 130.

Generally, the term "computer-readable medium", as used herein, refers to any medium that participated in providing instructions to the processor 104 for execution. Such a medium may take many forms, including but not limited to, non-volatile media, volatile media and transmission media. Non-volatile media includes, for example, optical or magnetic disks, such as the storage device 110. Volatile media includes dynamic memory, such as the main memory 106. Transmission media includes coaxial cables, copper wire and fiber optics, including the wires that comprise the bus 102. Transmission media can also take the form of acoustic or light waves, such as those generated during radio wave and infrared data communications.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for placement of a plurality of virtual machines into a plurality of nodes, comprising:
for each node of the plurality of nodes:
ordering a list of the plurality of virtual machines based on a profitability of each virtual machine of the list at a particular amount of resources required by the virtual machine to operate one or more applications, wherein the profitability of the virtual machine at the particular amount of resources is a metric indicative of an estimated application utility of the one or more applications relative to the particular amount of resources; and
for each virtual machine of the list:
determining whether an available capacity of the node exceeds a minimum amount of resources required by the virtual machine to operate one or more applications, wherein the available capacity of the node is indicative of an amount of resources available on the node for allocation; and
in response to determining the available capacity of the node exceeds the minimum amount of resources:
allocating a share of the available capacity of the node to the virtual machine based on a comparison between an estimated application utility of the one or more applications relative to the minimum amount of resources and an estimated application utility of the one or more applications relative to a maximum amount of resources required by the virtual machine to operate the one or more applications; and
adjusting the available capacity of the node based on the share allocated to the virtual machine.

2. The method of claim 1, further comprising:
for each node of the plurality of nodes:
determining whether the available capacity of the node exceeds zero; and
in response to determining the available capacity of the node exceeds zero, expanding the share allocated to the virtual machine.

3. The method of claim 1, wherein allocating a share of the available capacity of the node to the virtual machine based on a comparison between an estimated utility of the one or more applications relative to the minimum amount of resources and an estimated utility of the one or more applications relative to a maximum amount of resources required by the virtual machine to operate the one or more applications comprises:
determining whether the estimated application utility of the one or more applications relative to the minimum amount of resources exceeds the estimated application utility of the one or more applications relative to the maximum amount of resources.

4. The method of claim 3, wherein the share allocated to the virtual machine is equal to the minimum amount of resources in response to determining the estimated application utility of the one or more applications relative to the minimum amount of resources exceeds the estimated application utility of the one or more applications relative to the maximum amount of resources.

5. The method of claim 3, wherein the share allocated to the virtual machine is equal to one of the maximum amount of resources or the available capacity of the node in response to determining the estimated application utility of the one or more applications relative to the minimum amount of resources does not exceed the estimated application utility of the one or more applications relative to the maximum amount of resources.

6. A computer program product for placement of a plurality of virtual machines into a plurality of nodes, the computer program product comprising a computer readable storage medium having program instructions embodied therewith, the program instructions readable by a processor to cause the processor to:
for each node of the plurality of nodes:
order a list of the plurality of virtual machines based on a profitability of each virtual machine of the list at a particular amount of resources required by the virtual machine to operate one or more applications, wherein the profitability of the virtual machine at the particular amount of resources is a metric indicative of an estimated application utility of the one or more applications relative to the particular amount of resources; and
for each virtual machine of the list:
determine whether an available capacity of the node exceeds a minimum amount of resources required by the virtual machine to operate one or more applications, wherein the available capacity of the node is indicative of an amount of resources available on the node for allocation; and
in response to determining the available capacity of the node exceeds the minimum amount of resources:
allocate a share of the available capacity of the node to the virtual machine based on a comparison between an estimated application utility of the one or more applications relative to the minimum amount of resources and an estimated application utility of the one or more applications relative to a maximum amount of resources required by the virtual machine to operate the one or more applications; and
adjust the available capacity of the node based on the share allocated to the virtual machine.

7. The computer program product of claim 6, the program instructions readable by the processor to further cause the processor to:
for each node of the plurality of nodes:
determine whether the available capacity of the node exceeds zero; and
in response to determining the available capacity of the node exceeds zero, expand the share allocated to the virtual machine.

8. The computer program product of claim 6, wherein allocate a share of the available capacity of the node to the virtual machine based on a comparison between an estimated utility of the one or more applications relative to the minimum amount of resources and an estimated utility of the one or more applications relative to a maximum amount of resources required by the virtual machine to operate the one or more applications comprises:
determining whether the estimated application utility of the one or more applications relative to the minimum amount of resources exceeds the estimated application utility of the one or more applications relative to the maximum amount of resources.

9. The computer program product of claim 8, wherein the share allocated to the virtual machine is equal to the minimum amount of resources in response to determining the estimated application utility of the one or more applications relative to the minimum amount of resources exceeds the estimated application utility of the one or more applications relative to the maximum amount of resources.

10. The computer program product of claim 8, wherein the share allocated to the virtual machine is equal to one of the maximum amount of resources or the available capacity of the node in response to determining the estimated application utility of the one or more applications relative to the minimum amount of resources does not exceed the estimated application utility of the one or more applications relative to the maximum amount of resources.

11. A system for placement of a plurality of virtual machines into a plurality of nodes, comprising:
a memory device configured to store instructions;
at least one hardware processor configured to execute the instructions including:
for each node of the plurality of nodes:
ordering a list of the plurality of virtual machines based on a profitability of each virtual machine of the list at a particular amount of resources required by the virtual machine to operate one or more applications, wherein the profitability of the virtual machine at the particular amount of resources is a metric indicative of an estimated application utility of the one or more applications relative to the particular amount of resources; and
for each virtual machine of the list:
determining whether an available capacity of the node exceeds a minimum amount of resources required by the virtual machine to operate one or more applications, wherein the available capacity of the node is indicative of an amount of resources available on the node for allocation; and
in response to determining the available capacity of the node exceeds the minimum amount of resources:
allocating a share of the available capacity of the node to the virtual machine based on a comparison between an estimated application utility of the one or more applications relative to the minimum amount of resources and an estimated application utility of the one or more applications relative to a maximum amount of resources required by the virtual machine to operate the one or more applications; and
adjusting the available capacity of the node based on the share allocated to the virtual machine.

12. The system of claim 11, wherein the instructions further include:
for each node of the plurality of nodes:
determining whether the available capacity of the node exceeds zero; and
in response to determining the available capacity of the node exceeds zero, expanding the share allocated to the virtual machine.

13. The system of claim 11, wherein allocating a share of the available capacity of the node to the virtual machine based on a comparison between an estimated utility of the one or more applications relative to the minimum amount of resources and an estimated utility of the one or more applications relative to a maximum amount of resources required by the virtual machine to operate the one or more applications comprises:
determining whether the estimated application utility of the one or more applications relative to the minimum amount of resources exceeds the estimated application utility of the one or more applications relative to the maximum amount of resources.

14. The system of claim 13, wherein the share allocated to the virtual machine is equal to the minimum amount of resources in response to determining the estimated application utility of the one or more applications relative to the minimum amount of resources exceeds the estimated application utility of the one or more applications relative to the maximum amount of resources.

15. The system of claim 13, wherein the share allocated to the virtual machine is equal to the minimum amount of resources in response to determining the estimated application utility of the one or more applications relative to the minimum amount of resources does not exceed the estimated application utility of the one or more applications relative to the maximum amount of resources.

16. The method of claim 1, wherein an estimated application utility of one or more applications on a virtual machine is based on an estimated output the virtual machine generates using an amount of resources required by the virtual machine to operate the one or more applications.

17. The method of claim 1, further comprising:
ordering the plurality of nodes based on an available capacity of each node of the plurality of nodes.

18. The method of claim 1, wherein the share allocated to the virtual machine maximizes a total net utility of the plurality of virtual machines, and the total net utility of the plurality of virtual machines is a difference between an estimated application utility of applications on the plurality of virtual machines and a cost of keeping the plurality of nodes powered on.

19. The computer program product of claim 6, wherein an estimated application utility of one or more applications on a virtual machine is based on an estimated output the virtual machine generates using an amount of resources required by the virtual machine to operate the one or more applications.

20. The system of claim 11, wherein an estimated application utility of one or more applications on a virtual machine is based on an estimated output the virtual machine generates using an amount of resources required by the virtual machine to operate the one or more applications.

* * * * *